United States Patent [19]

Dhopeshwarkar et al.

[11] Patent Number: 4,956,766

[45] Date of Patent: Sep. 11, 1990

[54] SYSTEMS FOR INHIBITING ERRORS CAUSED BY MEMORY CARTRIDGE INSERTION/REMOVAL USING AN IDLE LOOP

[75] Inventors: Dhirendra Dhopeshwarkar; Scott A. Hightower; Mac A. Mathis; John W. Mehl, all of Lexington, Ky.

[73] Assignee: International Business Machines Corp., Armonk, N.Y.

[21] Appl. No.: 759,002

[22] Filed: Jul. 25, 1985

[51] Int. Cl.$^5$ ............... G06F 9/04; G06F 11/20; G06F 11/36
[52] U.S. Cl. ............... 364/200; 364/239.9; 364/240.2; 364/240.7; 364/244.7; 364/249.8; 364/265.3; 364/267.8
[58] Field of Search ... 364/200MS File, 900 MS File, 364/406, 567; 371/15, 16, 14; 273/148 B

[56] References Cited

U.S. PATENT DOCUMENTS

| 3,548,176 | 12/1970 | Shutler | 371/4 |
|---|---|---|---|
| 3,548,177 | 12/1970 | Hartlipp et al. | 371/4 |
| 3,548,178 | 12/1970 | Carnevale et al. | 371/4 |
| 3,971,925 | 7/1976 | Wenninger et al. | 364/706 |
| 4,145,752 | 3/1979 | Olander, Jr. et al. | 364/200 |
| 4,220,991 | 9/1980 | Hamano et al. | 364/900 |
| 4,297,029 | 10/1981 | Carlson | 371/15 |
| 4,385,366 | 8/1983 | Housey, Jr. | 364/900 |
| 4,400,783 | 8/1983 | Locke | 364/900 |
| 4,419,738 | 12/1983 | Takahashi et al. | 364/900 |
| 4,454,591 | 6/1984 | Lou | 364/900 |
| 4,462,084 | 7/1984 | Greenwood | 364/900 |
| 4,481,587 | 11/1984 | Daniels, Jr. | 364/567 |
| 4,523,296 | 6/1985 | Healy | 364/900 |
| 4,593,376 | 6/1986 | Volk | 364/900 |
| 4,596,390 | 6/1986 | Studley | 273/148 B |
| 4,597,058 | 6/1986 | Izumi et al. | 364/900 |
| 4,641,241 | 2/1987 | Boram | 364/409 |
| 4,860,333 | 8/1989 | Bitzinger et al. | 379/10 |
| 4,868,822 | 9/1989 | Scott et al. | 364/200 |

OTHER PUBLICATIONS

IBM Tech. Dis. "Extension Device for a Personal Computer" vol. 27, No. 12, May 1985, pp. 6887–6889.
Igel, "Variable–Performance Processors", IBM Technical Disclosure Bulletin, vol. 17, No. 12, May 1975, pp. 3708–3710.
Globig, "Avoid Data Loss in Nonvolatile Memory", E.D.N. Electrical Design News, vol. 29, No. 18, Sep. 6, 1984, p. 225.
Nippon Denki K.K., "Data Memory Protecting Circuit", Patent Abstracts of Japan, vol. 6, No. 237 (p–157) [1115], Nov. 25, 1982.
Matsushita Denki Sangyo K.K., "Privacy Protecting Device for Information in Memory", Patent Abstracts of Japan, vol. 8, No. 55 (P–260) [1492], Mar. 13, 1984.

Primary Examiner—Archie E. Williams, Jr.
Assistant Examiner—Ayni Mohamed
Attorney, Agent, or Firm—Pollock, Vande Sande and Priddy

[57] ABSTRACT

A computer system with provision for inserting/removing memory cartridges is improved by inhibiting erroneous operation as a result of noise produced on insertion/removal of a memory cartridge. Removable cartridges are connected/disconnected from a cartridge bus which is distinct from the system bus to which all other components are coupled. A controlled isolation is provided between the two buses. An idler routine ensures that in the absence of operator requested tasks the isolation prevents noise on the cartridge bus from reaching the system bus. When the processor executes an instruction (or only selected instructions) the isolation is disabled so that data/instructions can flow to/from the system and cartridge bus.

11 Claims, 1 Drawing Sheet

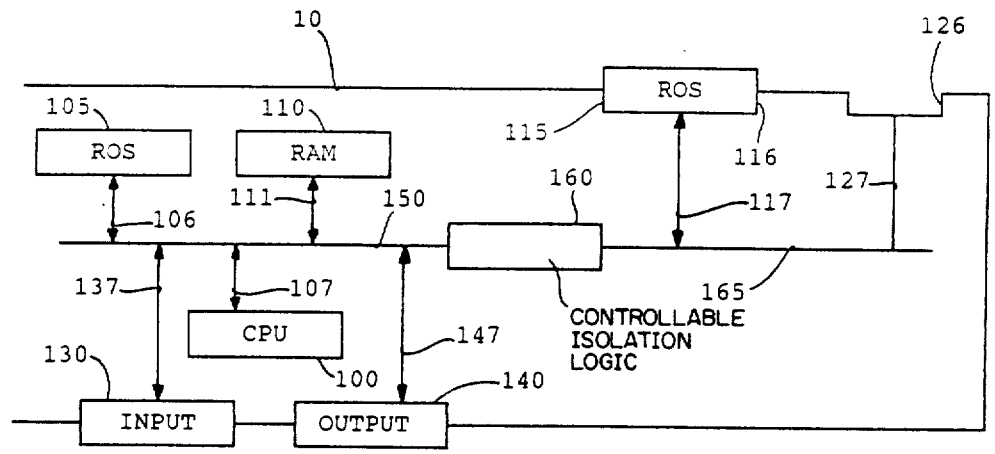
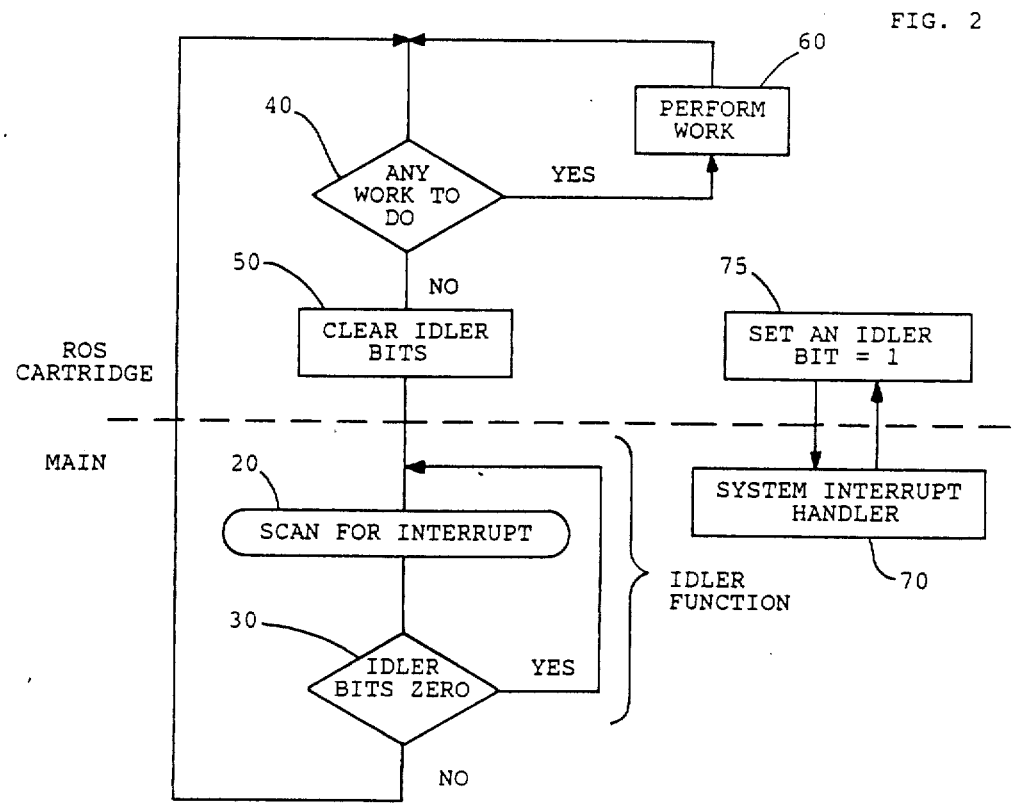
FIG. 2

SYSTEMS FOR INHIBITING ERRORS CAUSED BY MEMORY CARTRIDGE INSERTION/REMOVAL USING AN IDLE LOOP

FIELD OF THE INVENTION

The present invention relates to operator controlled computer systems, especially those systems which include provision for insertion/removal of one or more memory cartridges including read only storage and/or random access memory.

BACKGROUND ART

Computer systems are used for a wide variety of tasks and are usually directed by an operator. It is now common in the computer industry to provide systems which include provision for the insertion/removal of memory cartridges, wherein the cartridges are either read only storage or read/write storage, or both. Examples of such systems include Wenninger et al U.S. Pat. No. 3,971,925; Hamano et al U.S. Pat. No. 4,220,991; Housey, Jr. U.S. Pat. No. 4,385,366; Takahashi et al U.S. Pat. No. 4,419,738; Lou U.S. Pat. No. 4,454,591 and Daniels, Jr. U.S. Pat. No. 4,481,587.

Wenninger et al for example provides an Adaptable Programmed Calculator with a provision for plug in memory modules. These plug in ROMs can contain programs which can be executed by the user from the keyboard. Hamano deals with electronic cash registers which accept plug in random access (read/write) cartridges. Housey, Jr. describes a programmable device in which memory modules are selectively connected (such as by a plug in cartridge) read only memories to personalize the device. Takahashi describes a system in which a plug in read/write memory is used to transfer data to a dedicated read/write memory in an electronic cash register. Lou describes an interface system for bus line control in an electronic calculator which employs, in addition to fixed memory modules, plug in memory modules.

Finally, Daniels, Jr. describes an apparatus for providing interchangeable keyboard functions, which apparatus includes insertable memory modules.

In some systems in which read only or read/write memory can be inserted/removed, operating instructions require that the insertion/removal be accomplished when the system is powered down, an example of such a system is the last-mentioned Daniels, Jr. patent. He describes (see col. 8, lines 53 et seq) that after ROM insertion is effected, the "user then turns the scale 112 on by supplying power thereto". Video games and the PCjr are other examples of systems which include memory cartridges which can be inserted or removed, but in which the insertion/removal is effected when the system is powered down. In many cases, however, while the insertion/removal of the memory cartridge effects a reset operation, data is to be retained across this reset; that is, data stored prior to the reset is to be retained so that it can be used after the reset. In other systems, or other applications of the same systems, there is a desire to maintain the system powered up even though a memory cartridge may be inserted/removed. We have found that the insertion/removal of a cartridge can, in response to the electrical disturbances caused by the insertion/removal, produce unwanted changes and/or erroneous operations. The insertion/removal of an electrical component will, by reason of contact bounce and similar phenomena, produce undesired changes in electrical voltages on the conductors connected thereto. These undesired voltage changes can be catastrophic. For example, the undesired voltage changes may alter a word on a data or address bus which can result in:

execution of an incorrect instruction; or
access of an incorrect memory address (for either a read or a write operation).

The consequences of noise on a data or address bus has been recognized in the prior art, see Hartlipp et al U.S. Pat. No. 3,548,177; Shutler U.S. Pat. No. 3,548,176 and Carnevale U.S. Pat. No. 3,548,178. In these patents, a noise detector is provided in the computer system which, in the presence of noise, initiates some action to inhibit or minimize the consequences of the noise. These references are not related to memory cartridges which can be inserted/removed, require the addition of noise detector hardware, and may slow down machine execution

SUMMARY OF THE INVENTION

In contrast the present invention recognizes that if the noise can be isolated, the harmful effects can be limited or eliminated. The present invention relates to a computer system which includes provision for memory cartridges which can be inserted/removed and includes at least two separate buses, wherein each bus may include address conductors, data conductors, and control conductors. The first of these two buses is dedicated to the fixed or immovable components which for example includes a central processing unit, read/write memory and read only storage, and may also include additional peripheral equipment such as input apparatus or output apparatus. The second or cartridge bus is the bus to which a memory cartridge is connected when the memory cartridge is inserted, and from which the memory cartridge is disconnected when a memory cartridge is removed. Obviously the system bus and the cartridge bus cannot be entirely divorced, since if that were the case the CPU could never obtain access to any memory cartridge. Rather, isolating logic is coupled between the system bus and the cartridge bus, the isolating logic provides isolation except when access is required to address space which resides on the cartridge bus. To the extent that the isolating logic decouples the cartridge bus from the system bus; the noise on a cartridge bus will not be reflected on the system bus. It is then only necessary to require that when a memory cartridge is being inserted/removed, that the isolating logic is controlled so as to maintain isolation between the cartridge bus and the system bus. In accordance with the invention the isolation is maintained by the presence of an idle loop which does not require access to the cartridge bus.

In a particular embodiment of the invention the computer system which includes provision for plug in memory cartridges may be a typewriter or word processor. In systems of this sort, the system is executing tasks (operating) only in response to operator requests For example the operator may be inserting text into read/write memory, this requires operator actuation of an input device such as a keyboard; alternatively the operator may request the printing of text from read/write memory, and this too requires operator action to initiate the printing. The invention is implemented in such a typewriter or word processor by providing the program with an idle loop which is operative in the absence of execution of a task requested by an operator. The idle loop does not require access to the cartridge bus and thus the isolation is effective during execution to decouple system and cartridge buses. During this period of time the operator can insert/remove memory cartridges without affecting the system components coupled to the system bus since the decoupled state prevents any noise present on the cartridge bus from reaching the system bus. This operation is assured by instructing the operator that cartridge removal/inserted is only effected when operator initiated commands are not being executed. Since the operator's attention would normally be directed to memory cartridge insertion/removal, under normal circumstances operator invoked commands would not be executed simultaneously with cartridge insertion/removal.

The invention can be employed by providing the system ROS with a program which includes the idle loop, and which provides for the appropriate control of the isolating logic to decouple the cartridge and the system bus except during those times when apparatus coupled to the cartridge bus is invoked. An alternative scheme, which does not require the system ROS to include the idle routine can be effected by recognizing that in many systems the program stored in the system ROS is not executed from the ROS itself. Rather, in those systems initial program steps transfer the program from the system ROS to system RAM, and the program is executed out of RAM. Accordingly, in order to prevent disturbances occasioned by memory cartridge removal, the idle routine may be contained in the memory cartridge itself. Here, cartridge insertion necessarily requires that the system be powered down. When the system is powered up, the idle routine from the memory cartridge itself is transferred to system RAM. The idle routine thus is executed out of system RAM and provides for the appropriate isolation so that on memory cartridge removal, the isolation ensures the decoupling of the cartridge bus and system bus.

Thus in accordance with one aspect, the invention provides, in a computer system arranged to perform tasks initiated at operator request, which system includes a central processor and main memory unit connected by a system bus, and in which at least some of said tasks require additional memory cartridges, a method of inhibiting errors caused by the insertion/removal of a memory cartridge, said method comprising the steps of:

(a) providing a cartridge bus to which memory cartridges are connected/disconnected on insertion/removal, (b) providing a controllable isolation between said system bus and said cartridge bus, and (c) providing an idle loop for said central processor effective except at times when an operator requests a task to be performed, which idle loop does not provide for access to said cartridge bus.

In another aspect, the invention provides in a computer system arranged to perform tasks initiated at operator request, which system includes a central processor and a main memory interconnected by a system bus and in which at least some of said tasks require additional memory cartridges, apparatus for inhibiting errors caused by the insertion/removal of a memory cartridge. The apparatus includes a cartridge bus associated with apparatus for connecting/disconnecting memory cartridges to the cartridge bus on insertion/removal. The apparatus further includes a controllable isolation logic which is coupled between the system bus and the cartridge bus for isolating the system bus and the cartridge bus except when access is required to the cartridge bus. Finally, the apparatus includes an arrangement for limiting the central processor from execution on the system bus unless the operator requests a task to be performed.

BRIEF DESCRIPTION OF THE DRAWINGS

The present invention will be further described in the following portions of this specification when taken in conjunction with the attached drawings in which like reference characters identify identical apparatus and in which:

FIG. 1 is a block diagram of a computer system which includes provision for insertion/removal of memory cartridges;

FIG. 2 is an embodiment of software routines implementing the invention.

DETAILED DESCRIPTION OF THE PREFERRED EMBODIMENT

FIG. 1 shows an example of a computer system which includes memory cartridges which may be inserted and removed. More particularly, the computer system 10 includes a fixed series of components including CPU 100, ROS 105, RAM 110, an input device 130 and an output device 140. All these devices are interconnected by system bus 150 through connectors 111, 106, 107, 137 and 147. In addition, the system 10 provides a slot 116 for a memory cartridge 115. When inserted in the slot 116 the memory cartridge 115 is connected to the bus 165 via the connector 117. As shown in FIG. 1, a second slot 126 may be provided which, when filled with a memory cartridge is connected to the bus 165 via the connector 127.

The slot 126 may be used for memory in the form of additional ROS or RAM. Obviously, the number of slots can be increased beyond the two which are illustrated. The system bus 150 is coupled to cartridge bus 165 via isolation logic 160. The isolation logic 160 is available in typical commercially available devices and is described in the Intel iAPX 86, 88 User's Manual (August 1981) as including latch, buffer and transceivers. Isolation logic 160 is responsive to signals carried over address and/or control conductors of the system bus 150 to allow coupling of bus 150 to bus 165 only when address space connected to bus 165 is accessed. There may be further cartridge buses coupled to the system bus 150 via other isolation logic modules. The system 10 is subject to the prior art deficiencies in that when a memory cartridge such as ROS 115 is inserted/removed the act of insertion/removal produces noise on the bus 165 which can adversely affect the performance of any of the devices connected thereto. Specifically, since the isolation logic 160 may allow signals to pass from one bus to the other, there is no guarantee that noise on bus 165 will be isolated from system bus 150.

In one prior art system fixed ROS 105 provided essentially no operating functions except support for functions directed by a feature cartridge such as ROS 115. The typical ROS 115 maintained the CPU 100 executing in a tight loop of instructions from ROS 115. In such a system the insertion/removal of any other cartridge (such as in slot 126) was almost surely to generate erroneous execution since the logic 160 was almost continuously maintained in a condition to couple bus 150 to bus 165 (for instruction fetch). We have recognized that to the extent that the isolating logic 160 decouples the cartridge bus 165 from the system bus 150, then noise produced or: the cartridge bus 165 as a consequence of the insertion/removal of the memory cartridge will be unable to affect any of the other components, e.g. the RAM 110, the ROS 105, the CPU 100, the input device 130 or the output device 140. To eliminate the problem it was necessary, once the problem was recognized, to ensure that the operator's act of insertion/removal was, in time, mutually exclusive of the CPU accessing the cartridge bus 165.

As will be described in connection with FIG. 2 the software executed by the CPU 100 includes an idler function. The idler function is invoked by the system feature via a vector stored at a predetermined address in system RAM 110. The idler function, executing only within the system bus 150, retains control so long as an idler spin flag in the system RAM 110 is in a predetermined condition, for example zero. The invoker or system feature is responsible for maintaining the idler flag. As soon as the idler flag becomes non-zero (or more generally different than its rest or normal state) the idler function returns control to the invoker. The feature software, residing in an inserted memory cartridge, invokes the idler whenever it is waiting for work. When an external interrupt is fielded by the feature, indicating work is being requested, the feature interrupt handler alters the idler spin flag. After the interrupt is fully processed the idler function returns control to the feature to process the work request.

More particularly, FIG. 2 shows software which is used to implement the invention. The dashed line in FIG. 2 separates the main system software (residing in a component coupled to the main bus 150) from the cartridge software (which is associated with a memory cartridge). More particularly, as shown in FIG. 2 an idler function includes interrupt scan 20 and a decision point 30 in the form of a branch, one route being followed (back to the scan 20) in the event that the idler flag or idler bits are in a predetermined condition (zero). On the other hand, the other path (to the decision point 40, associated with the memory cartridge) is followed if the idler flag (idler bits) are not in their predetermined condition. FIG. 2 omits the typical power on and initialization functions which are conventional. Generally, these functions are executed with the system bus 150. The decision point 40 determines whether or not there is work to do, and itself branches to one of two paths. A first path is followed in the event there is work pending, and that path leads to the function 60 to execute or perform the work. After a particular work unit is performed, the decision point 40 is again entered. When the work has been completed, the other path from decision point 40 is followed to function 50. Function 50 clears the idler bits (alters the idler flag back to its predetermined condition). It should be apparent therefore that as long as the idler flag (idler bits equal zero) are in their predetermined condition, then there is no need to nor is there any reference to the memory cartridge. Under these conditions the isolating logic 160 is maintained in its decoupled condition and noise on the cartridge bus 165 will be unable to adversely affect any component coupled to the system bus 150. When the system interrupt handler 70 fields an interrupt requiring execution out of or reference to a memory cartridge, one step during the fielding of the interrupt is function 75 to alter the idler flag from its predetermined condition to another condition (such as to set an idler bit to one). On return from the interrupt to the idler, the decision point 30 will determine that the idler flag is no longer in its predetermined condition (the idler bits are no longer zero). This will invoke reference to the appropriate memory cartridge and generate an address within the cartridge bus address space so that the isolating logic 160 no longer decouples the cartridge bus 165 from the system bus 150. After completion of any work requiring reference to a memory cartridge, the function 50 is performed to alter the idler flag back to its predetermined condition. Of course, absence of references to cartridge bus address space renders isolation again effective.

The operating instructions accompanying the computer system advise the operator not to insert or remove a memory cartridge while the system is "busy". The term "busy" is defined, based on the particular characteristics of the system and the feature or features provided by the memory cartridge or cartridges. Thus when a cartridge is inserted or removed, the noise on the cartridge bus 165 created by altering the electrical connections will have no effect on any component coupled to the system bus 150.

As shown in FIG. 2, only when the idler bits are non-zero (occasioned by the need for reference to a memory cartridge) is there reference to the cartridge bus which inhibits the isolation between a system bus 150 and a cartridge bus 165. In one implementation of the invention, CPU 100 was an Intel 8088.

FIG. 2 specifically illustrates those functions related to the invention. There may be, in addition, other functions which CPU 100 executes wholly within the system bus 150 and thus do not require reference to cartridge bus 165. Typically, the invention will be implemented by providing ROS 105 (the on card ROS) with the idler function (20, 30). However, that is not essential. An alternate implementation is based on the recognition that instructions need not be executed out of ROS, but rather the initial program steps in the ROS call for loading the program into the RAM 110 and the majority of the code is executed from the RAM 110. In systems of the latter type, the software represented in FIG. 2 need not be contained in the ROS 105. Alternatively, this software can be contained in a ROS memory cartridge, along with other feature or features provided by the memory cartridge. Using the alternate implementation the ROS feature cartridge (such as 115) is initially referenced to load RAM 110 with the idle loop. Thereafter, the idle loop is executed from RAM 110 and no reference to cartridge bus 165 is necessary except for the feature code contained therein.

In accordance with this alternate implementation, the system should be powered up with a a ROS feature cartridge (including the software of FIG. 2) in order to obtain the full protection of the invention. If the alternate implementation is employed, the system is powered up in the absence of an ROS feature cartridge having the software of FIG. 2, and thereafter a memory cartridge is inserted, the idler loop (20–30) may be absent and thus the full protection provided by the invention may not be present.

Assuming that the system is powered up with an ROS feature cartridge inserted, then when the RAM 110 is loaded with the program (from the ROS 105) it is also loaded with at least the idle loop software of FIG. 2 (from the ROS feature cartridge 115). Thereafter, the alternate implementation operates in exactly the same fashion as if the software of FIG. 2 had been included in the ROS 105.

Those skilled in the art will recognize that many changes can be made within the scope of the invention, which is to be interpreted in accordance with the following claims.

We claim:

1. In a computer system arranged to perform tasks initiated at operator request, which system includes a central processor and main memory interconnected by a system bus, and in which at least some of said tasks require additional memory cartridges, a method of inhibiting errors caused by the insertion or removal of a memory cartridge, said method comprising the steps of:
  (a) providing a cartridge bus to which memory cartridges are connected or disconnected on insertion or removal,
  (b) providing a controllable isolation between said system bus and said cartridge bus, and
  (c) providing an idle loop for said central processor, which idle loop does not provide access to said cartridge bus, said idle loop having an exit to a path allowing access to said cartridge bus by said central processor in response to a predetermined condition so that said idle loop is effective to prevent access to said cartridge bus except in response to a said predetermined condition which is present when an operator requests a task to be performed.

2. The method of claim 1 in which said step (c) includes providing an idle loop for said central processor with said exit to a path for disabling said controllable isolation and connecting said cartridge bus and system bus in response to an operator request requiring information contained in one or more of said memory cartridges.

3. The method of claim 1 in which said computer system further includes a keyboard for entering operator requests and a printer, all connected to said system bus and a ROS feature cartridge and which includes the further steps of:
  (d) inserting said ROS feature cartridge, and
  (e) initiating a task at operator request wherein said steps (d) and (e) are effected at mutually exclusive times.

4. The method of claim 1 in which said computer system further includes a keyboard for entering operator requests and a printer, all connected to said system bus and a RAM cartridge and which includes the further steps of:
  (d) inserting the RAM cartridge, and
  (e) initiating a task at operator request wherein said steps (d) and (e) are effected at mutually exclusive times.

5. The method of claim 1 in which step (c) includes the step of providing a ROS coupled to said system bus.

6. The method of claim 1 in which step (c) includes the step of providing a memory cartridge coupled to said cartridge bus.

7. A computer system arranged to perform tasks initiated at operator request, which system includes a central processor and a main memory interconnected by a system bus and in which at least some of said tasks require additional memory cartridges, apparatus for inhibiting errors caused by the insertion or removal of a memory cartridge, said apparatus comprising:
  (a) a cartridge bus including means for connecting or disconnecting memory cartridges to said cartridge bus on insertion or removal,
  (b) controllable isolation logic means controlled by said central processor coupled between said system bus and said cartridge bus for isolating said system bus and said cartridge bus except when access is required to said cartridge bus, and
  (c) limiting means for limiting said central processor to execution on said system bus, said limiting means having an idle loop preventing access by said central processor to said cartridge bus, said idle loop including an exit to a path allowing access by said central processor to said cartridge bus which exit is used under a predetermined condition when said operator requests a task to be performed.

8. The system of claim 7 in which said limiting means includes program means comprising:
  a ROS coupled to said system bus.

9. The system of claim 7 in which said limiting means includes program means comprising a memory cartridge.

10. The system of claim 7 in which said limiting means includes a ROS feature cartridge coupled to said cartridge bus.

11. The system of claim 7 in which said limiting means includes a memory cartridge coupled to said cartridge bus.

* * * * *

UNITED STATES PATENT AND TRADEMARK OFFICE
CERTIFICATE OF CORRECTION

PATENT NO. : 4,956,766

DATED : September 11, 1990

INVENTOR(S) : Dhopeshwarkar et al

It is certified that error appears in the above-identified patent and that said Letters Patent is hereby corrected as shown below:

On the title page, in item [54] and in column 1:
In the title, "Systems" should be –System–.

Col. 2, lines 18-19, there should be a period after "execution", line 47, the semicolon should be a comma;

line 59, there should be a period after "requests".

Col. 3, line 9, "removal/inserted" should be –removal/insertion–.

Col. 5, line 1, "or:" should be –on–.

Col. 6, line 52, the second "a" should be deleted.

Signed and Sealed this

Seventh Day of January, 1992

Attest:

HARRY F. MANBECK, JR.

*Attesting Officer*　　　*Commissioner of Patents and Trademarks*